United States Patent [19]

Suffi

[11] Patent Number: 5,451,170
[45] Date of Patent: Sep. 19, 1995

[54] TERMINAL BLOCK WITH PROTECTION

[75] Inventor: Louis Suffi, Westchester, Ill.

[73] Assignee: Reliance Comm/Tec Corporation, Mayfield Heights, Ohio

[21] Appl. No.: 127,895

[22] Filed: Sep. 28, 1993

[51] Int. Cl.⁶ .................................... H01R 4/24
[52] U.S. Cl. ................... 439/404; 439/620; 439/709
[58] Field of Search ................ 439/395–405, 439/709–715, 721, 723–725, 620, 922

[56] References Cited

U.S. PATENT DOCUMENTS

| | | | |
|---|---|---|---|
| 4,159,500 | 6/1979 | Baumbach et al. | 439/922 |
| 4,362,347 | 12/1982 | Berglund et al. | 439/922 |
| 4,652,070 | 3/1987 | Suffi | 339/97 |
| 4,759,057 | 7/1988 | De Luca et al. | 439/922 |
| 4,856,735 | 7/1989 | Teichler et al. | 439/709 |
| 4,919,622 | 4/1990 | Suffi | 439/395 |
| 5,157,580 | 10/1992 | Hegner et al. | 361/119 |
| 5,163,855 | 11/1992 | Gerke et al. | 439/395 |
| 5,297,970 | 3/1994 | Carney | 439/922 |

OTHER PUBLICATIONS

"Quick, . . . Protection" (6 pages) ADC Telecommunications 1992.
Krone Product Catalog MIL005-01.101, Krone AG, Jul. 14, 1992 and Dec. 7, 1992.

Primary Examiner—David L. Pirlot
Attorney, Agent, or Firm—Trexler, Bushnell, Giangiorgi & Blackstone, Ltd.

[57] ABSTRACT

A terminal block mounts a plurality of insulation displacement connector type terminal clips formed of an electrically conductive material, each terminal clip having a base portion, an insulation displacing wire-engaging portions projecting outwardly from the base portion and a wire wrap post projecting outwardly from the base portion in a direction opposite to the wire-engaging portion. A block body formed of an electrical insulator material has an upper block section and a lower block section configured for releasably lockingly interengaging the upper block section. The upper block section and the lower block section each have a plurality of generally parallel spaced apart walls defining therebetween a plurality of open-ended cavities. Alignment structures are formed respectively on the upper and lower block sections for aligning respective ones of the cavities, such that one of the open ends of each cavity aligns with an open end of a corresponding cavity in the other of the upper and lower block sections, and such that opposite open ends of each cavity face outwardly when the upper and lower block sections are interengaged. Each cavity of the upper block section is configured for surroundingly receiving one of the terminal clips with the wire wrap post thereof extending toward the lower block section; and each cavity of the lower block section is configured for receiving a protector element therein. A plurality of connectors are provided, each operatively coupled with one of the wire wrap posts and configured for electrical engagement with a protector element.

20 Claims, 7 Drawing Sheets

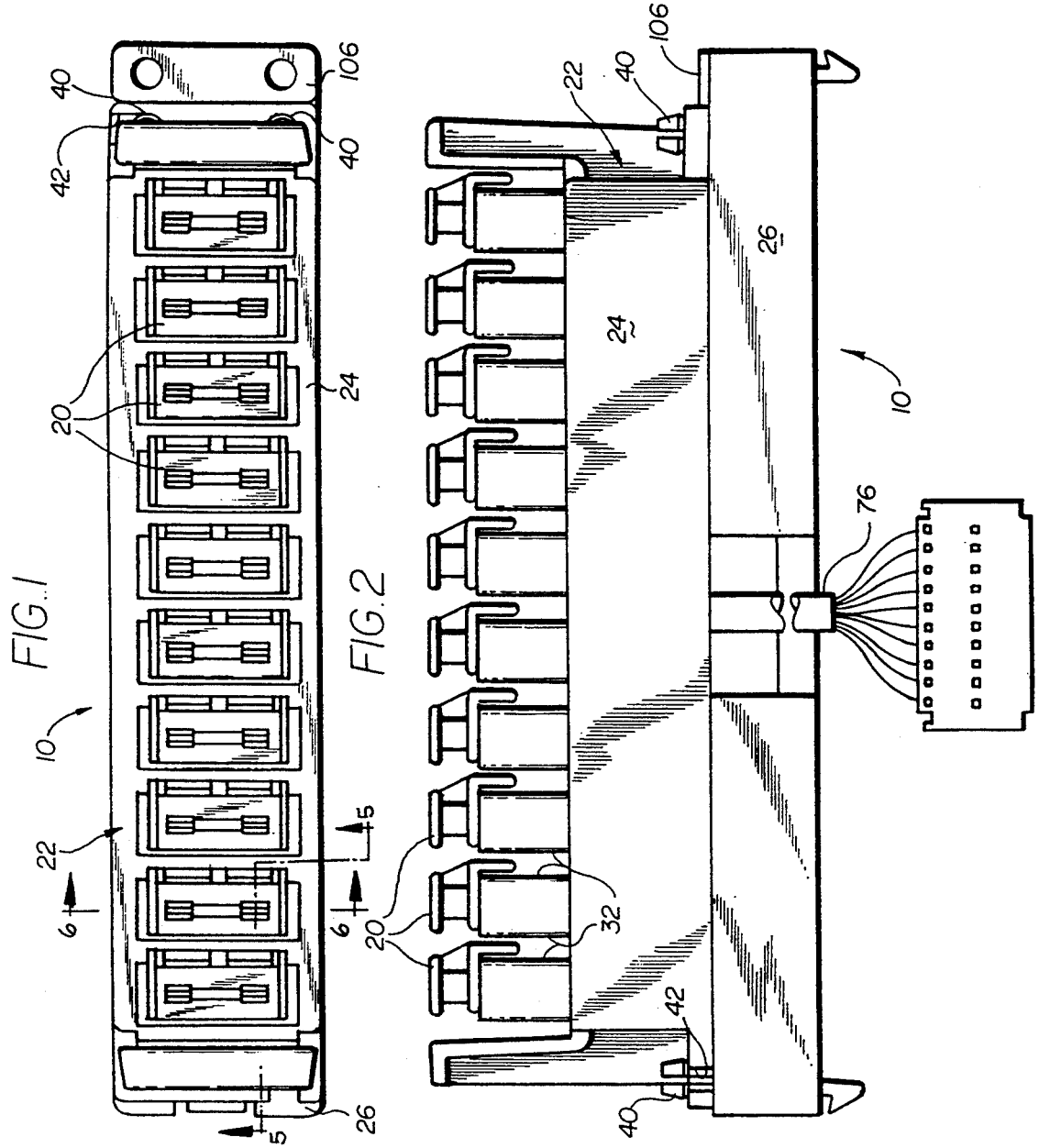

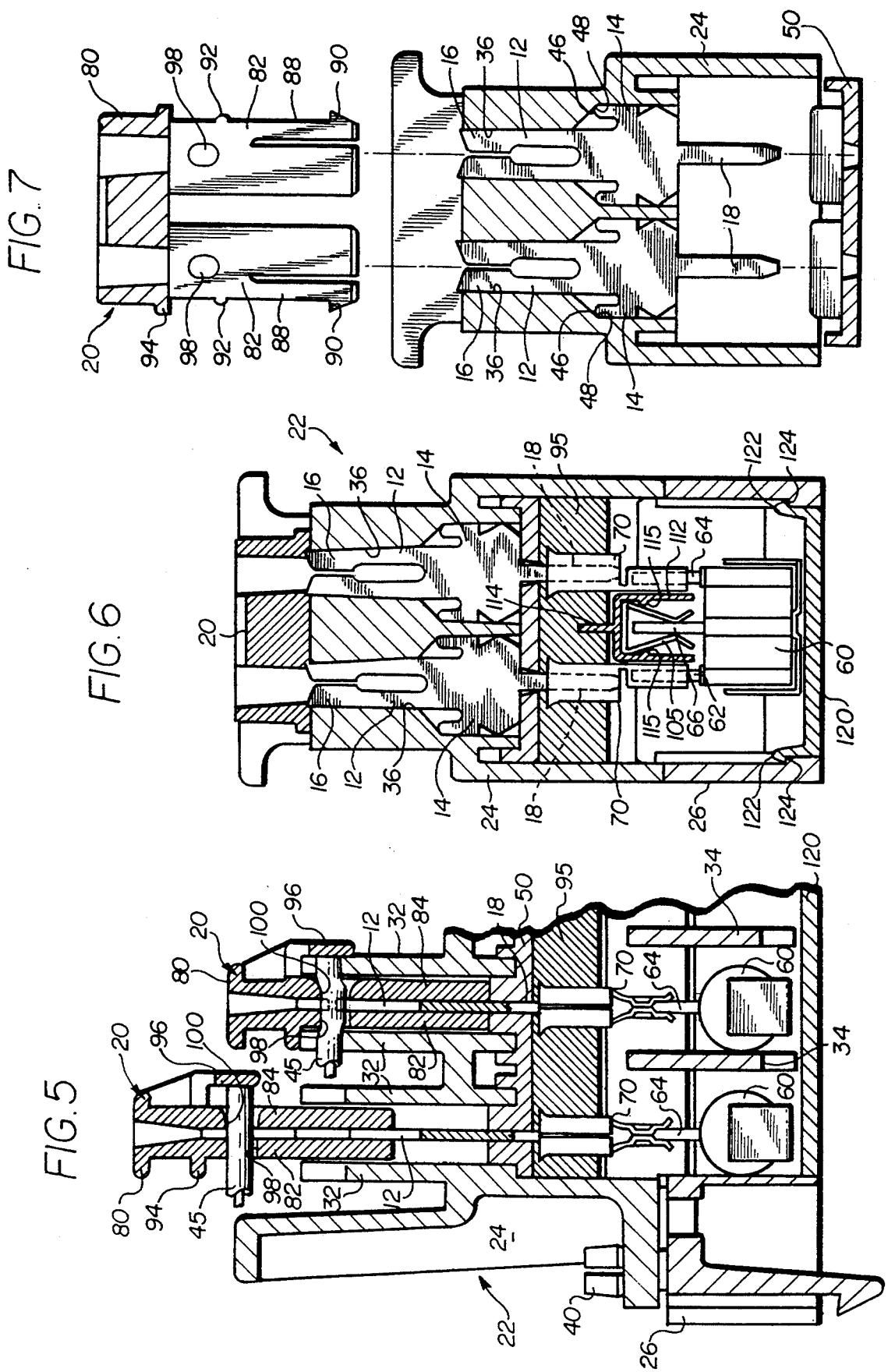

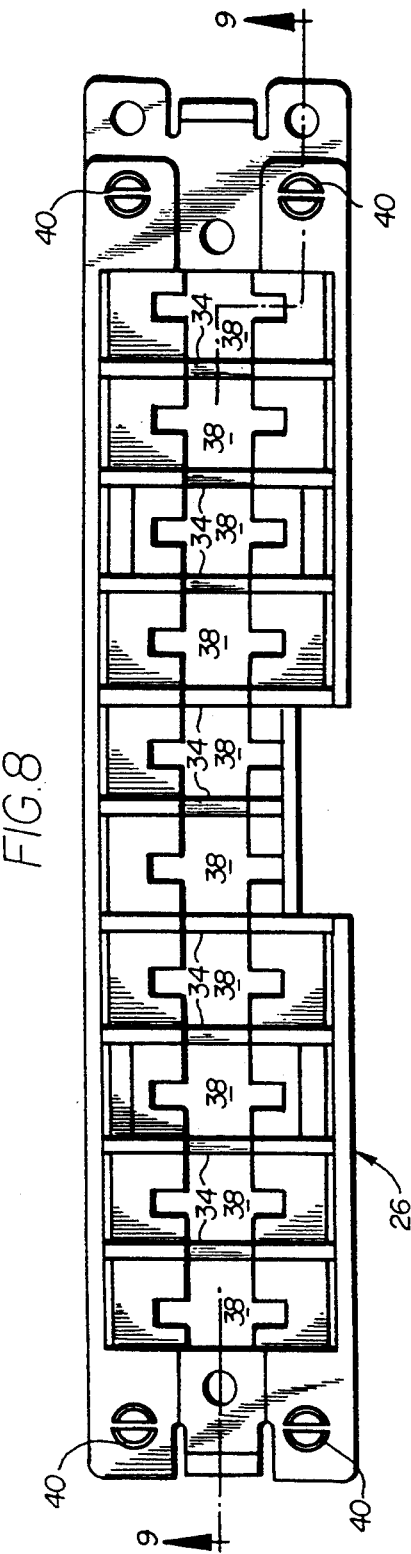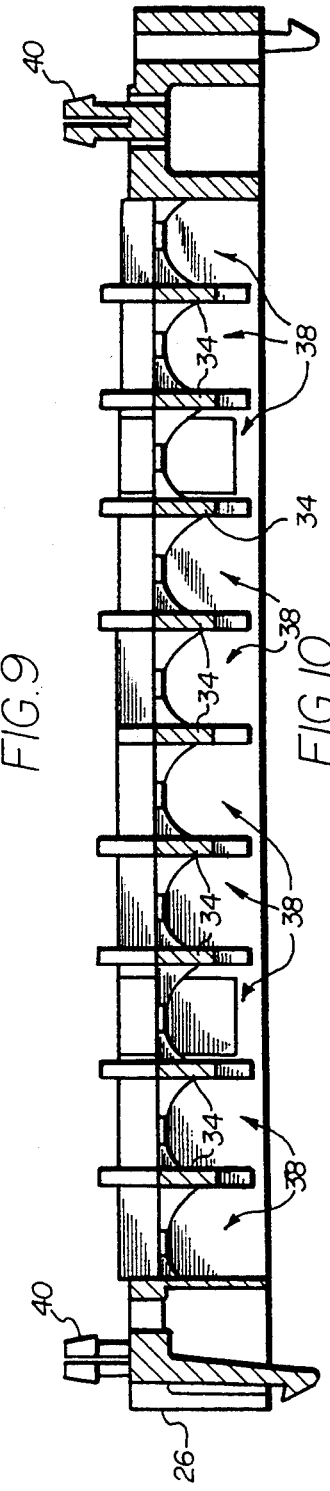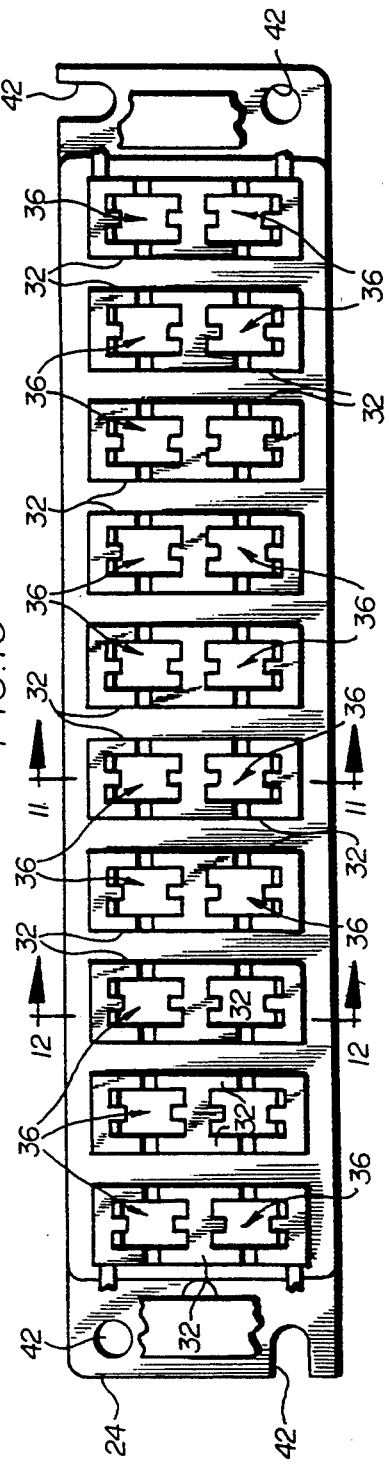

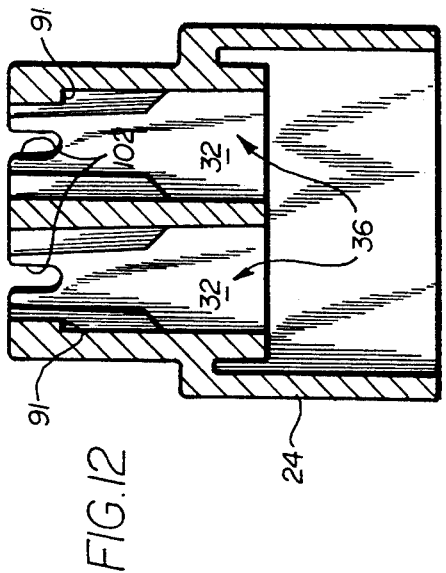
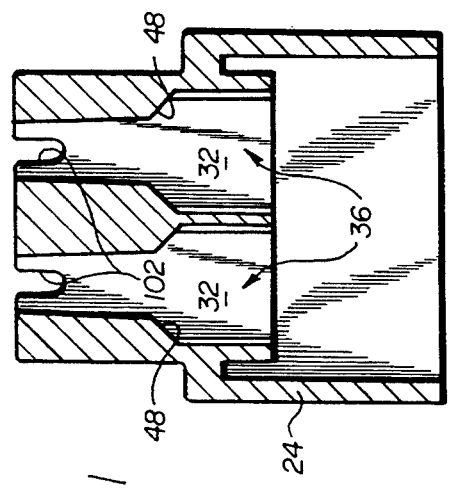
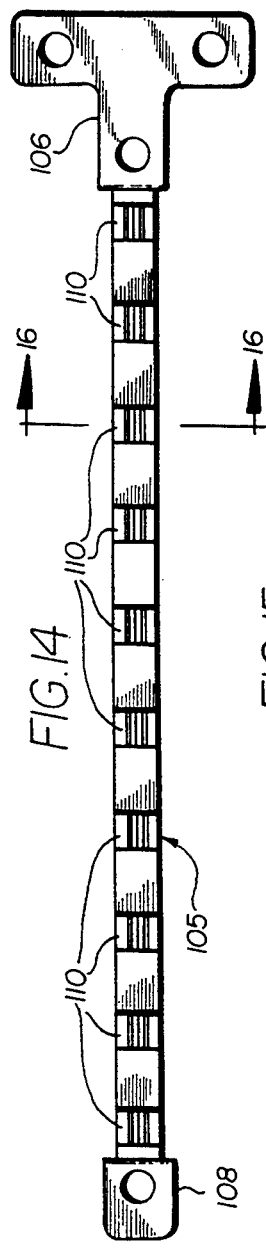
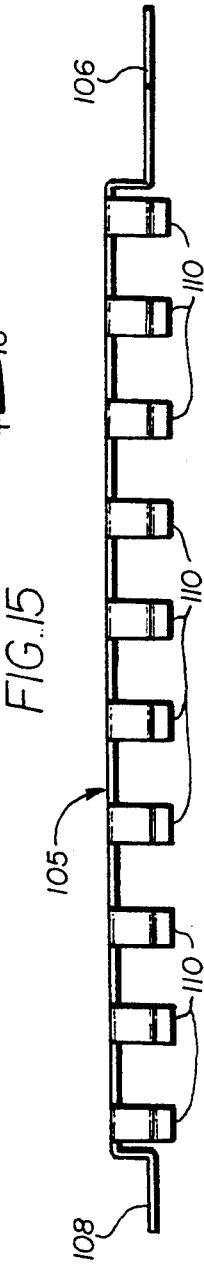

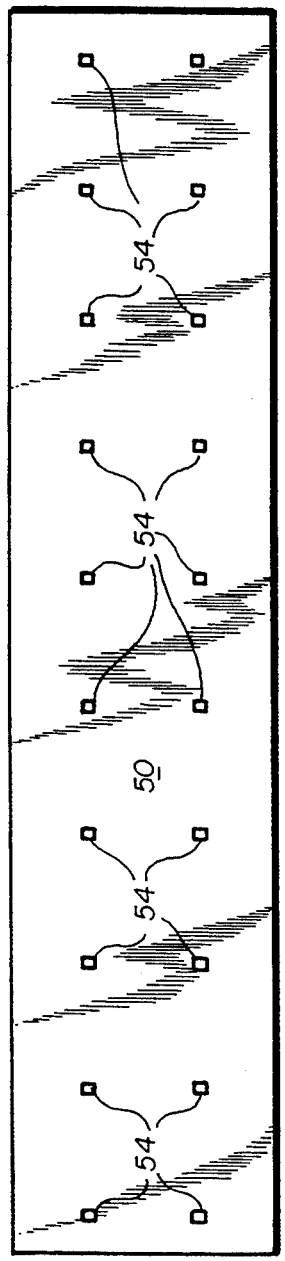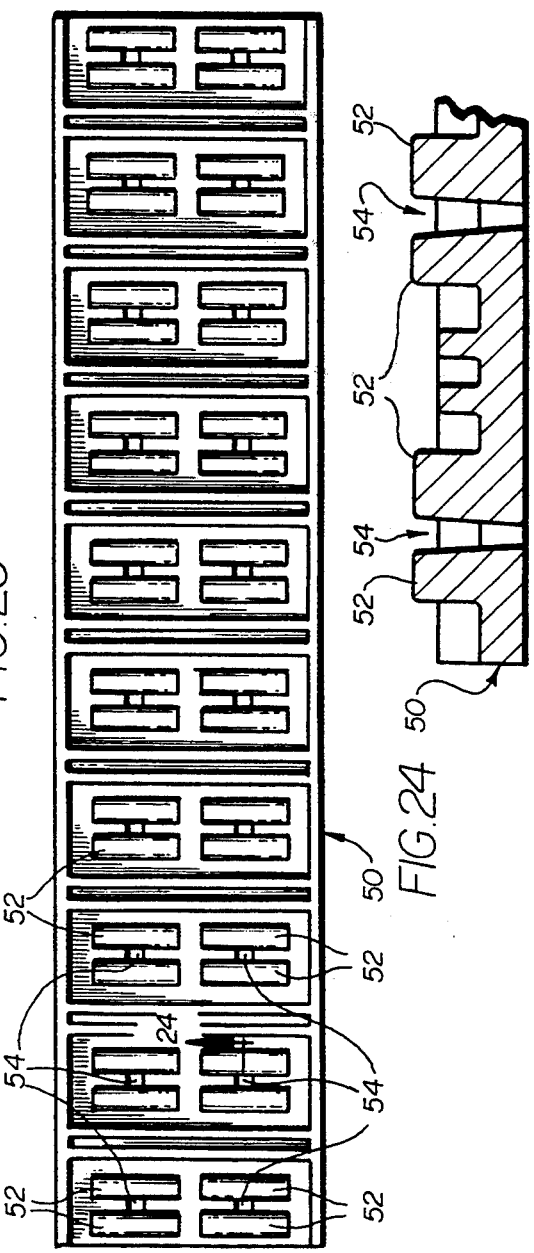

TERMINAL BLOCK WITH PROTECTION

BACKGROUND OF THE INVENTION

The present invention relates to terminal blocks and more particularly to a terminal block of the type which incorporates overvoltage protection for such as telecommunications conductors which are terminated or interconnected at the terminal block.

Terminal blocks are utilized in the telecommunications industry to provide an interconnection point for the individual line pair conductors of multi-pair cables. Such terminal blocks may provide interconnections between cables from the central office and subscriber cables or interconnections between a central office cable and a multi-pair cable servicing a local area such as a housing subdivision.

Some terminal blocks utilize insulation displacement connector (IDC) terminal clips or connectors. This type of connector automatically pierces the insulation of a portion of the wire to establish an electrical connection when the wire is inserted therein by means of a suitable tool, and usually a hand tool specially designed for this purpose. One particularly useful terminal block of this type is illustrated and described for example in prior U.S. Pat. No. 4,652,070.

This patent discloses a terminal block which advantageously utilizes activators which are captively mounted in the terminal block and associated with each IDC terminal clip to accomplish connection of a conductor with the clip, in place of the special hand tool normally required for this purpose. A second wire connection to each terminal clip in blocks of this type is accomplished by a wire wrap operation. Thus, the opposite end of this terminal clip generally comprises a wire wrap post which projects outwardly toward the opposite side of the terminal block. Generally speaking, terminal blocks of this type are preconnectorized. That is, an appropriate cable stub is provided, having its respective conductors factory prewired to the respective wire wrap terminals of the terminal clips within the block.

Heretofore, overvoltage or overcurrent protection for such terminal blocks has been separately provided. That is, separate protector modules mounted on a separate block have generally been provided, requiring hand wiring of individual protectors of the protector block to individual terminals of the terminal block. However, in U.S. Pat. No. 4,846,735, an arrangement is provided for plug-in protector modules which are plugged into the upper surface of a terminal block which has been especially constructed to receive the protector modules. In this arrangement, the protector modules are attached to the terminal block above the open faces of IDC connectors housed therein, in such a way that access to the IDC connectors is blocked by the protector module. Also, the terminal block is specially designed and constructed to receive the plug-in protector modules requiring a number of relatively complex additional parts and a relatively complicated arrangement and assembly of these parts, requiring additional steps in handling and assembly.

OBJECTS AND SUMMARY OF THE INVENTION

It is a general object of this invention to provide a novel and improved terminal block which provides overvoltage protection.

A related object is to provide an improved IDC type terminal block in accordance with the foregoing object in which the construction and assembly of the various parts of the block are greatly simplified.

Briefly, and in accordance with the foregoing objects, the present invention provides a terminal block comprising a block body formed of an electrical insulator material; said block body comprising an upper block section and a lower block section configured for releasably lockingly interengaging said upper block section to form said block body, each of said upper block section and said lower block section having a plurality of generally parallel spaced apart walls defining therebetween a plurality of open-ended cavities; alignment means formed respectively on said upper and lower block sections for aligning respective ones of said cavities, such that one open end of each cavity aligns with an open end of a corresponding cavity in the other of the upper and lower block sections, and such that the opposite open end of each cavity faces outwardly, when the upper and lower block sections are interengaged; each of said cavities of said upper block section being configured for surroundingly receiving a terminal clip, and each of said cavities of said lower block section being configured for receiving a protector element therein.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 1 a top plan view of a terminal block in accordance with the invention;

FIG. 2 is a side elevation of the terminal block of FIG. 1;

FIG. 3 is an end elevation of the terminal block of FIGS. 1 and 2;

FIG. 5 is an enlarged partial sectional view taken generally along the line 5—5 of FIG. 1;

FIG. 6 is an enlarged sectional view taken generally along the line 6—6 of FIG. 1;

FIG. 7 is a sectional view similar to FIG. 6 and partially exploded;

FIG. 8 is a top plan view of a lower block portion of the terminal block of the invention;

FIG. 9 is a developmental view taken generally along the line 9—9 of FIG. 8;

FIG. 10 is a top plan view, partially broken away, of an upper block section of the terminal block of the invention;

FIG. 11 is an enlarged sectional view taken generally in the plane of the line 11—11 of FIG. 10;

FIG. 12 is an enlarged sectional view taken generally in the plane of the line 12—12 of FIG. 10;

FIG. 13 is a side elevation of a ground clip shield member;

FIG. 14 is a top plan view of a ground bar member;

FIG. 15 is a side elevation of the ground bar member of FIG. 14;

FIG. 21 is a sectional view taken generally along the line 21—21 of FIG. 20;

FIG. 22 is a top plan view of a barrier strip;

FIG. 23 is a partial bottom plan view of the barrier strip of FIG. 22; and

FIG. 24 is an enlarged partial sectional view taken generally along the line 24—24 of FIG. 22.

DETAILED DESCRIPTION OF THE ILLUSTRATED EMBODIMENT

Figure 4:
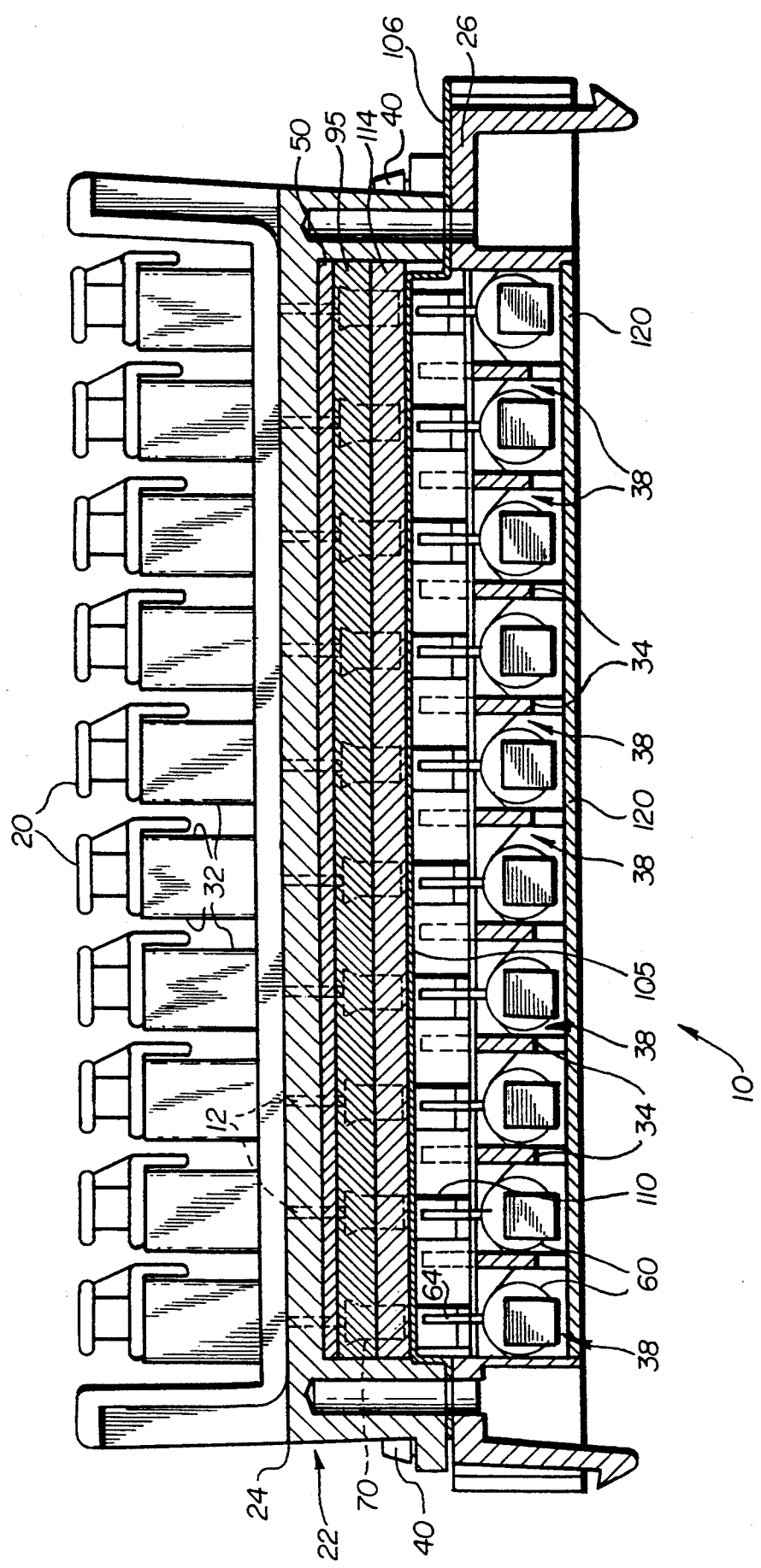
FIG. 4 is a developmental view, taken generally along the line 4—4 of FIG. 3.

Referring now to the drawings and initially to FIGS. 1–7, the terminal block in accordance with the invention is designated generally by the reference numeral 10. The terminal block 10 is configured for mounting a plurality of terminals for terminating or interconnecting conductors, such as telecommunication conductors.

In the illustrated embodiment, these terminals take the form of insulation displacement connector (IDC) terminal clips 12, as best viewed in FIG. 7. As shown in FIG. 7, each of these terminal clips 12 has a base portion 14 a projecting insulation displacing wire-engaging portion 16 and a wire wrap post 18 projecting from the base portion 14 oppositely outwardly of the wire-engaging portion 16. The construction of the insulation displacing wire-engaging portion 16 is preferably as illustrated and described in U.S. Pat. No. 4,919,622.

The terminal clips 12 are arrayed in the illustrated embodiment in side-by-side pairs, tip (T) and ring (R), within the terminal block 10. However, other arrangements of these terminal clips 12 within the block 10 may be utilized without departing from the invention.

Associated with each of the pairs of terminal clips 12 in the illustrated embodiment is a activator member 20, as best viewed in FIGS. 5–7. The activators 20 may be configured to operate in connection with fewer or more terminal clips, which may be arranged in any desired configuration relative to terminal block 10, without departing from the invention. Each activator 20 is moveable between a first position for receiving a wire 45, and a second position for pressing the wire 45 into engagement with the wire-engaging portion 16 of one of the terminal clips 12, as shown in FIG. 5. Moreover, terminal clips having multiple wire-engaging portions projecting from each base 14 may be utilized to accommodate multiple wire interconnections or terminations, if desired, without departing from the invention.

Referring also to FIGS. 8–12, the terminal block 10 includes a block body 22 formed from a dielectric or electrical insulator material, and preferably a durable, moldable plastics material. The block body 22 comprises an upper block section 24 and a lower block section 26 which are configured for releasably lockingly interengaging to form the block body 22. Each of the upper block section 24 and lower block section 26 comprises a plurality of generally parallel and spaced walls 32, 34. The walls 32 and the walls 34 define respectively therebetween respective pluralities of elongate open-ended cavities 36 and 38. In the embodiment illustrated, the walls 32 are substantially equally spaced and of equal height. Similarly, the walls 34 are also shown as being substantially equally spaced and of equal height.

As illustrated, the cavities 36 are spaced apart, being defined only between every other pair of walls 32. However, the cavities 38 are side-by-side, the walls 34 being spaced by about one and one-half times the spacing between the walls 32, such that each wall 34 aligns with a point approximately one-half way between two of the cavities 36. Thus, except for the two endmost ones of cavities 38, which are somewhat off-center relative to the corresponding aligned endmost ones of cavities 36, each cavity 38 is substantially centered on a corresponding one of the cavities 36.

The upper and lower block sections 24, 26 are additionally provided with alignment means for aligning respective ones of the cavities 36, 38. As best viewed in FIGS. 4–7, these alignment means comprise complementary formed interengagable projecting means or resiliently compressible posts 40 and recess means or apertures 42 which are formed on the upper and lower block sections 24, 26. In the illustrated embodiment, the posts 40 are formed at opposite ends of the lower body section 26, while the complementary apertures 42 are formed on the upper block section 24. The opposite arrangement may be employed without departing from the invention.

Each of the cavities 36 is also configured for receiving an activator 20 slidably movable therein. As best viewed in FIG. 7, the activator 20 is slidably movable between a first position for permitting insertion of a conductor 45 into the activator 20 and a second position for engaging a conductor 45 previously inserted into the activator with the wire-engaging portion 16 of the terminal clip 12 in the associated cavity 36.

As best shown in FIGS. 6–7 and 11–12, the cavities 36 and the terminal clips 12 include cooperating interengagable portions for fixedly engaging one of the terminal clips within each cavity 36. In this regard, the base portion 14 of each terminal clip will be seen to extend laterally outwardly to present respective edges 46 which engage facing inner surfaces 48 within each cavity 36.

Referring now also to FIGS. 22–24, an elongate, generally rectangular barrier strip or panel 50 forms a bottom closure member which interfits with the upper block section for securing the terminal members 12 within the cavities 32. Barrier strip 50 is provided with a plurality of through apertures 52 which receive the wire wrap posts 18 of the respective IDC clips 12 therethrough. The apertures 52 are centered between respective pairs of parallel spaced raised ridges 54 which embrace and center the IDC terminal clips 12 within the respective cavities 32.

Referring also to FIGS. 8 and 9, the structure of the lower block section 26 is shown in further detail. It will be seen that each of the cavities 38 defined between the walls 34 is configured and adapted for receiving therein a protector element or module 60. In the illustrated embodiment, the protector 60 is a three-element gas tube protector. As such, the protector 60 incorporates a pair of gas tube type overvoltage protectors which have respective externally projecting terminal leads 62, 64 and share a common, central ground lead 66.

These protectors are arranged and located within the lower block section 24 to achieve electrical engagement of the respective terminals 62 and 64 with respective ones of the wire wrap posts 18 which project through the barrier strip 50. Thus, just as the cavities 32 and associated IDC terminal clips 12 are arranged in side-by-side pairs, the gas tube protectors are arranged for providing overvoltage protector for each of the terminals in a side-by-side arrangement as illustrated. In this regard, each gas tube protector element includes a pair of gas-filled arc gaps across which an overvoltage will be passed to ground, each of the respective terminals 62 and 64 being electrically connected with one side of the respective arc gaps and the ground terminal 66 being coupled with the other side of both arc gaps contained within the protector element or module 60.

Figure 19:
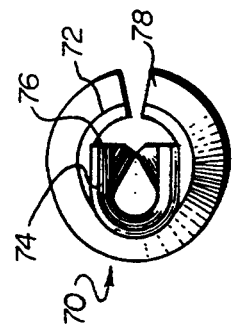
FIG. 19 is a top plan view of the sleeve element of FIGS. 17 and 18.
Figure 18:
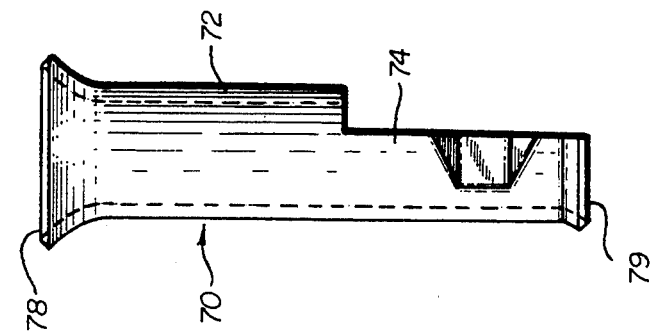
FIG. 18 is a side elevation of the sleeve element of FIG. 17.
Figure 17:
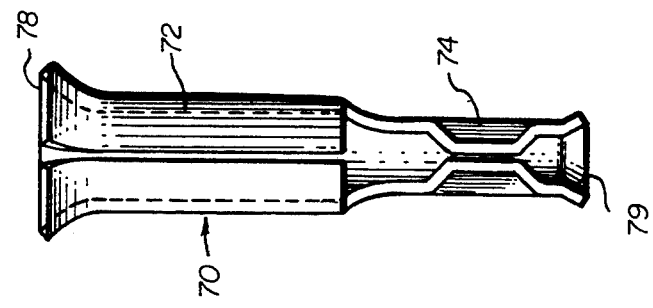
FIG. 17 is a front elevation of a sleeve element.

Referring now to FIGS. 17 and 18, respective conductive sleeve members or elements 70 are provided for interconnecting respective ones of wire wrap posts 18 with respective terminal leads 62 and 64 of the gas tube protectors 60. As best viewed in FIGS. 17–19, the sleeves include an enlarged diameter first end portion 72 for engaging a wire-wrapped one of the posts 18, and a reduced diameter second end portion 74 for engaging one of leads 62, 64. In this regard, prior to attachment of first end portion 72, a wire or lead 75 is wrapped in a spiral or helical fashion about the wire wrap post 18. The respective wires or leads 75 are brought together to form a cable 76 which is fed externally of the housing 10 through a slot or opening 27 formed in the lower block section 26, and may be connectorized if desired. The sleeve members 70 are formed generally as a split sleeve from a metallic material, for resilient engagement and press-fitting with respect to the terminals 62, 64 and wire wrapped ones of the posts 18, respectively. Preferably, respective outer ends 78, 79 of the sleeve are flared outwardly to permit a push-over type of engagement with the respective wire wrapped posts 18 and terminal leads 62, 64.

In the process of assembly of the terminal block of the invention, immediately following application of the leads 75 to all of the wire wrap posts 18, the first ends 72 of the respective sleeves 70 are applied thereover. Thereupon, a quantity of potting material 95 is applied over the barrier strip 50 and around the first end portions 72 of sleeves 70 which have been applied over the wires 75 wrapped around the posts 18, to a depth covering a major portion of these first ends 72, but leaving the second ends 74 free for later receiving the terminal leads 62 and 64 of the protector elements 60.

Figure 16:
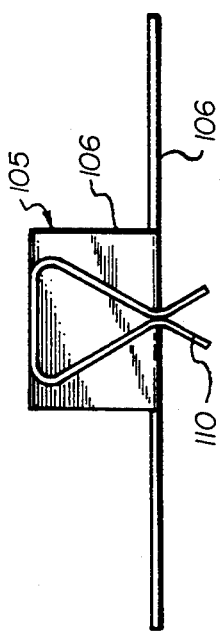
FIG. 16 is an enlarged sectional view taken generally along the line 16—16 of FIG. 14.

Referring next to FIGS. 13–16, a ground strip assembly is provided for engaging the respective ground terminals or leads 66 of the protectors 60 and for extending externally of the terminal block 10 for coupling all of these ground terminals or leads to an external ground. Referring initially to FIGS. 14–16, a ground strip member 105 comprises an elongate metallic element having an enlarged apertured T-shaped termination member or portion 106 at one end and a smaller apertured termination element or portion 108 at its opposite end. Along the length of the ground strip 105 are located a plurality of spaced apart clip members 110 which are spaced arranged for engagement with respective-ground terminal leads 66 of the protector elements 60 located in the respective cavities 38 of the lower block section 26, as shown in FIG. 6.

In order to electrically isolate the respective ground clips 110 from engagement with the sleeve portions 74 to either side thereof an additional ground clip shield member 112 is provided. As best viewed FIG. 13, the ground clip shield member 112 comprises a generally elongate, U-shaped extrusion, preferably formed of an insulator such as a suitable plastics material, and having a projecting spine portion 114. As best viewed in FIG. 6, the spine portion 114 is preferably embedded in the potting material 95, preferably upon initial application of the potting material as described above and before the material sets up.

Upon the setting up of the potting material 95, the portions 74 of the respective sleeves 70 and the ground strip barrier 112 will be projecting outwardly of the cavity 36. The ground strip 105 may then be snappingly engaged with the U-shaped shield member 112, which is provided with internally projecting raised ridges 115 to promote snapping engagement over the enlarged base portions of the respective ground clip elements 110. The respective termination members or portions 106, 108 of the ground strip project oppositely outwardly of the shield member 112. At this point, the lower block section 26 may be interfitted with the upper block section 24, and thereupon the gas tube elements 60 may be assembled with the respective ends 74 of the sleeves 70 and ground strip clip members 110.

Figure 20:
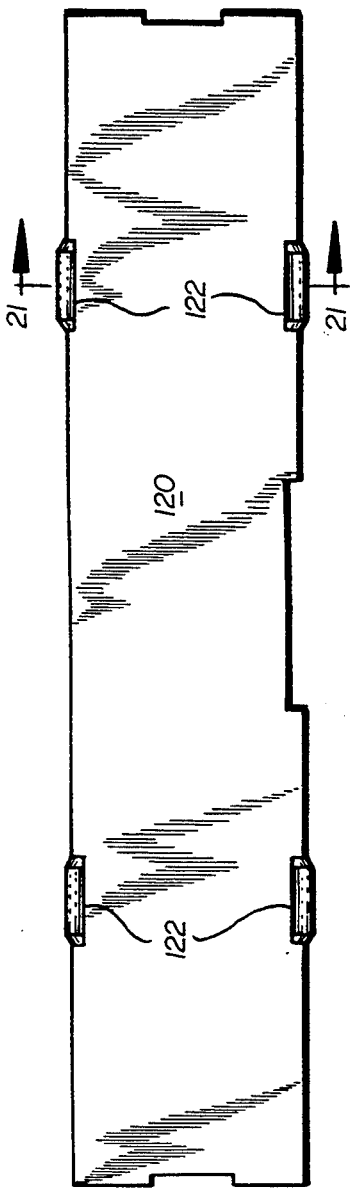
FIG. 20 is a top plan view of a bottom closure plate or panel.

Upon completing the foregoing assembly, the open bottom end portion of the lower block section 24 may be completely enclosed by the addition of a bottom panel member 120 as illustrated in FIGS. 20 and 21. The bottom panel 120 is provided with a plurality of upwardly projecting resilient barbed elements 122 for engaging complementary formed undercut or shoulder portions 124 which are provided along a lower edge of the lower block section 24 as illustrated in FIG. 6.

The above-described assembly results in the mounting and engagement of the terminal clips 12 within the cavities 36 so as to permit the pressing of a conductor 45 into the wire-engaging portion 16 of each terminal clip 12 with a force sufficient to strip the insulation from the conductor 45 and cause electrically conductive contact between the conductor 45 and the wire engaging portion 16 without dislodging the terminal clip from the cavity 36. Moreover, the overall configuration of each cavity 36 is such as to prevent any substantial movement or dislodgment of the clip from its substantially centered condition within the cavity during the insertion or removal of wires relative to the terminal clip.

Also, it will be seen that a sufficient gap or space is left in each cavity 36 adjacent the uppermost end of each wire-receiving portion 16 to permit relative outward flexing or parting of the portion 16 to a degree sufficient to receive a conductor 45 as the same as pressed into engagement therewith by action of the activator 20. The structure and operation of an IDC terminal clip of this type is more fully described in the above referenced U.S. Pat. No. 4,919,622, which is incorporated herein by reference in this regard.

Referring now to FIGS. 5–7, the activator 20 and its operation relative each cavity 36 is substantially similar to that illustrated and described in the above-referenced U.S. Pat. No. 4,652,070. In this regard, the activator 20 includes a gripping portion 80 for manual engagement thereof for movement between the first and second positions as illustrated in FIG. 5. A pair of parallel spaced legs 82, 84 extend from the gripping portion 80 and are configured for sliding engagement with one of the cavities 36. The spacing between the legs 82, 84 is somewhat greater than the thickness of the terminal clips 12 for permitting the legs 82, 84 to extend to either side of, and slide freely with respect to, the terminal clips 12 within respective cavities 36. In cooperation with the above-described terminals 12 and cavities 36, each activator 20 is configured for simultaneous engagement with a pair of side-by-side cavities 36. Hence, two similar pairs of legs 82, 84 extend from the base 80.

The legs 82, 84 are of a length at least as great as the depth of insertion of conductor 45 required for piercing of the insulator and conductive engagement between the conductor 45 and the wire engaging portion 16 of a terminal clip 12. In the illustrated embodiment, legs 82, 84 are longer, for reasons which will presently become apparent.

Each leg 82, 84 is provided with a flexible, resilient engagement portion 88 which terminates in an outwardly flared barb-like projection 90 for engaging a shoulder portion 91 (see FIG. 12) formed in each of cavities 36. This holds the activator member 20 captive in the cavity 36 once initially inserted therein and also defines the first position thereof shown in FIG. 5, extending outwardly of the cavity to receive a conductor 45.

Each of the legs 82, 84 further includes an outwardly projecting detent surface 92 which releasably snappingly engages or detents with one of shoulders 91 to define the second or fully advanced position of the activator 20 with respect to each cavity 36 as illustrated in FIGS. 5 and 6. The gripping portion 80 has an outwardly extending peripheral rim portion 94 for providing a stop or abutment surface for abutment against an upper edge portion of respective walls 32 to also define the fully advanced or second position of the actuator 20 as shown in FIGS. 5 an 6. A downwardly depending skirt portion 96 extends from the rim 94 to one of the side of the actuator, spaced from one of the legs 82, 84 to provide a stop surface for defining a fully advanced position of conductor 45, as shown in FIG. 5 with respect to wire engaging surfaces of the activator, which are defined by aligned through openings 98, 100 in the respective legs 82 and 84 thereof. Cooperatively, the respective walls 32 include open-topped, U-shaped slots or recesses 102 for permitting advancement of the conductor 45 by the activator 20 into engagement with the wire-engaging portions 16 of the terminal clips 12, as illustrated in FIGS. 5 and 6.

Accordingly, it will be seen that the respective wire engaging surfaces or apertures 98, 100 of the legs 82, 84 engage an outer insulation portion of a conductor 45 to either side of an associated terminal clip 12 which is located between the legs 82 and 84. The legs 82, 84 and cavity 36 are cooperatively configured for aligning a portion of the insulated conductor 45 intermediate the legs of 82 and 84 of the activator 20 with the wire-engaging portion 16 of the terminal clip 12 for piercing the insulation of the conductor 45 and electrically engaging the conductor with the terminal clip when the activator is advanced from the first position to the second position as illustrated in FIG. 5. The through openings 98 and 100 are thus configured and located for aligning the conductor 45 with an entrance to the wire-engaging portion 16 of the terminal clip within the cavity 36 when the activator 20 is in the first position, as indicated in FIG. 5, and for aligning the conductor 45 with the wire engaging portion 16 of the terminal clip 12 for causing piercing of the insulation of the conductor and electrically conductive contact of the conductor with the wire-engaging portion when the activator is in the second position, as illustrated in FIG. 5.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A terminal block comprising: a plurality of insulation displacement connector type terminal clips formed of an electrically conductive material, each terminal clip having a base portion, an insulation displacing wire-engaging portion projecting outwardly from said base portion and a wire wrap post projecting outwardly from said base portion in a direction opposite to said insulation displacing wire-engaging portion; a block body formed of an electrical insulator material; said block body comprising an upper block section and a lower block section configured for releasably lockingly interengaging said upper block section to form said block body, each of said upper block section and said lower block section having a plurality of generally parallel spaced apart walls defining therebetween a plurality of open-ended cavities; alignment devices formed respectively on said upper and lower block sections for aligning respective ones of said cavities, such that one open end of each cavity aligns with an open end of a corresponding cavity in the other of the upper and lower block sections and such that an opposite open end of each cavity faces outwardly, when the upper and lower block sections are interengaged; each of said cavities of said upper block section being configured for surroundingly receiving one of said terminal clips with said wire wrap post projecting toward said lower block section; and each of said cavities of said lower block section being configured for receiving a protector element therein; and a plurality of connectors, each connector being operatively coupled with one of said wire wrap posts and configured for electrical engagement with a protector element.

2. A terminal block according to claim 1 wherein said alignment devices include complementary formed interengagable projections and apertures formed on said upper and lower block sections.

3. A terminal block according to claim 1 wherein said alignment devices comprise a plurality of resiliently compressible posts projecting from one of said upper and lower block sections and a plurality of through apertures configured and located for receiving said posts and formed on the other of said upper and lower block sections.

4. A terminal block according to claim 1 and further including a barrier strip comprising a generally rectangular panel having a plurality of through openings located and aligned for receiving said wire-wrap posts therethrough, and configured for interfitting with said upper block section for engaging and positioning one of said terminal clips within each of said cavities.

5. A terminal block according to claim 1 wherein each of said connectors comprises a generally elongate tubular, radially resiliently expandable sleeve having one end configured for resiliently engaging in electrically conductive contact about a wire wrapped one of said wire wrap posts and an opposite end configured for resiliently engaging in electrically conductive contact about a terminal lead of a protector element.

6. A terminal block according to claim 5 and further including a barrier strip comprising a generally rectangular panel having a plurality of recesses located and aligned for receiving said wire-wrap posts therethrough, and configured for interfitting with said upper block section for engaging and positioning one of said terminal clips within each of said cavities.

7. A terminal block according to claim 5 and further including a plurality of gas tube protector elements, each having first and second projecting terminal leads and a projecting ground lead.

8. A terminal block according to claim 7 and further including an elongated ground strip element mounted intermediate said upper and lower blocks and having a plurality of spaced, projecting ground clips located and configured for engaging said ground leads of each of said gas tube protector elements in electrically conductive contact.

9. A terminal block according to claim 8 and further including an elongate shield formed of an electrical insulator material interposed about said ground clips for isolating said ground clips from electrical contact with said sleeves.

10. A terminal block according to claim 1 and further including a plurality of activators configured for selectively electrically coupling wires to said terminal clips; and each cavity of said upper block section being configured for receiving an activator slidably movable therein between a first position for permitting the insertion of a conductor into said activator, and a second position for engaging a conductor inserted into said activator with the wire-engaging portion of a terminal clip located in the cavity.

11. A terminal block according to claim 10 wherein each of said activators comprises a gripping portion for manually engaging said activator for movement between said first and second positions, a pair of parallel spaced legs extending from said gripping portion and configured for sliding engagement with one of said cavities, the spacing between said legs being greater than the thickness of one of said terminal clips for permitting said legs to extend to either side of and slide freely with respect to one of said terminal clips, said legs further being of a length at least as great as a depth of insertion of an insulated conductor required for conductive engagement with said wire-engaging portion of said terminal clip, a pair of aligned wire-engaging surfaces formed in said legs for engaging an outer insulation portion of an insulated conductor to either side of an associated terminal clip located between said legs, said legs and said cavity being configured for aligning a portion of an insulated conductor intermediate said legs with said wire-engaging portion of said terminal clip for piercing the insulation of an insulated conductor and electrically engaging the conductor with the terminal clip when the activator is advanced from said first position to said second position.

12. A terminal block according to claim 11 wherein said wire-engaging surfaces of said activator are defined by aligned through openings in said legs thereof, said openings being configured and located for aligning a conductor with an entrance to said wire-engaging portion of said terminal clip when said activator is in said first position and for aligning an insulated conductor with said wire-engaging portion of said terminal clip for piercing the insulation thereof and causing electrically conductive contact of said insulated conductor with said wire-engaging portion when said activator is moved to said second position.

13. A terminal block according to claim 11 and further including detent means formed on said legs of said activator located for engaging said internal shoulder surfaces in each of said cavities for releasably retaining said activator in said second position.

14. A terminal block according to claim 11 wherein said legs of said activator include flexible retaining portions and wherein said walls of said upper and lower block portion include internal shoulder surfaces within said cavities for engagement with said flexible retaining portions to define said first position of said activator and to retain said legs slidably captive within said cavity.

15. A terminal block according to claim 14 wherein said flexible retaining portions terminate in laterally projecting barbs having downwardly facing ramp surfaces, said flexible retaining portions being sufficiently resilient to compress and thereafter return to an uncompressed condition as said legs are initially slidably introduced to said cavity to permit initial snapping engagement of said barbs over said shoulder surfaces.

16. A terminal block according to claim 6 and further including a quantity of potting material placed adjacent said barrier strip member for potting said one end of each of said plurality of sleeves and thereby maintaining said one end in electrical and mechanical engagement with a wire wrapped about a corresponding one of said wire wrap posts.

17. A terminal block according to claim 16 wherein said potting material engages said barrier strip with a force of engagement sufficient to permit pressing of a conductor into the wire-engaging portion of each of said terminal clips with a force sufficient to strip the insulation from the conductor and cause electrically conductive contact between the conductor and the wire-engaging portion while retaining said terminal clip in said cavity.

18. A terminal block comprising: a block body formed of an electrical insulator material: said block body having an upper block section and a lower block section configured for releasably lockingly interengaging said upper block section to form said block body, each of said upper block section and said lower block section having a plurality of generally parallel spaced apart walls defining therebetween a plurality of open-ended cavities; alignment means formed respectively on said upper and lower block sections for aligning respective ones of said cavities; such that one open end of each cavity aligns with an open end of a corresponding cavity in the other of the upper and lower block sections and such that the opposite open end of each cavity faces outwardly, when the upper and lower block sections are interengaged; each of said cavities of said upper block section being configured for surroundingly receiving a terminal clip formed of an electrically conductive material, each terminal clip having a base portion, an insulation displacing wire-engaging portion projecting outwardly from said base portion and a wire wrap post projecting outwardly from said base portion in a direction opposite to said insulation displacing wire-engaging portion; each of said cavities of said upper block section being configured for mounting one of said terminal clips with said wire wrap post projecting toward said lower block section, and each of said cavities of said lower block section being configured for receiving a protector element therein.

19. A terminal block according to claim 18 and further including a plurality of connectors, each operatively coupled with one of said wire wrap posts and configured for electrical engagement with a protector element.

20. A terminal block comprising: a block body formed of an electrical insulator material having an upper block section and a lower block section releasably engaged to form said block body, each of said upper block section and said lower block section having a plurality of generally spaced apart walls defining therebetween a plurality of open-ended cavities; alignment devices formed respectively on said upper and lower block sections for aligning respective ones of said cavities, such that one open end of each cavity aligns with an open end of a corresponding cavity in the other of the upper and lower block sections and such that an opposite open end of each cavity faces outwardly, when the upper and lower block sections are engaged; a plurality of terminal clips formed of an electrically conductive material, each terminal clip having a base portion, an insulation displacing wire-engaging portion projecting from said base portion and a wire wrap post projecting from said base portion in a direction generally opposite said insulation displacing wire-engaging portion; each of said cavities of said upper block section being configured for surroundingly receiving one of said terminal clips with said wire wrap post projecting toward said lower block section; each of said cavities of said lower block section being configured for receiving a protector element therein; and a plurality of connectors, each connector being operatively coupled with one of said wire wrap posts and configured for electrical engagement with a corresponding protector element.

* * * * *